(12) United States Patent
Goldberg et al.

(10) Patent No.: US 8,446,925 B2
(45) Date of Patent: May 21, 2013

(54) REDUCTION OF TIMING JITTER IN A PASSIVE Q-SWITCHED SOLID STATE LASER

(75) Inventors: Lew Goldberg, Fairfax, VA (US); Brian J Cole, Fairfax Station, VA (US); John E Nettleton, Fairfax Station, VA (US); Dallas N Barr, Woodbridge, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 90 days.

(21) Appl. No.: 12/696,096

(22) Filed: Jan. 29, 2010

(65) Prior Publication Data
US 2011/0188522 A1 Aug. 4, 2011

(51) Int. Cl.
*H01S 3/113* (2006.01)

(52) U.S. Cl.
USPC ............................................. 372/11; 372/10

(58) Field of Classification Search
USPC ...................................................... 372/10, 11
See application file for complete search history.

(56) References Cited

U.S. PATENT DOCUMENTS

| | | | | |
|---|---|---|---|---|
| 3,754,190 | A * | 8/1973 | Cross | 372/11 |
| 5,408,480 | A * | 4/1995 | Hemmati | 372/10 |
| 6,078,606 | A * | 6/2000 | Naiman et al. | 372/97 |
| 6,335,942 | B1 * | 1/2002 | Huang et al. | 372/10 |
| 7,324,568 | B2 * | 1/2008 | Spariosu et al. | 372/10 |
| 2004/0258117 | A1 * | 12/2004 | Nebel et al. | 372/39 |
| 2005/0226280 | A1 * | 10/2005 | Spariosu et al. | 372/11 |
| 2005/0250049 | A1 * | 11/2005 | Wang et al. | 430/311 |

OTHER PUBLICATIONS

Yin et al., "Actively-controllable Passively Q-switched Laser", 2005, Proceedings of SPIE, vol. 5627, 199-208.*
Cole et al., "Optical triggering of a Q-switched Nd:YAG laser via transverse bleaching of a Cr:YAG saturable absorber", Oct. 27, 2009, Applied Optics, vol. 48 No. 31, 6008-6014.*
Cole et al., "Reduction of timing jitter in a Q-Switched Nd:YAG laser by direct bleaching of a Cr4+:YAG saturable absorber", Jan. 29, 2009, Optics Express, vol. 17, No. 3 1766-1771.*
"Cost-effective low timing jitter passively Q-switched diode-pumped solid-state laser with composite pumping pulses," by Jacob B. Khurgin et al, Applied Optics vol. 41, No. 6, 1095-1097 (Feb. 20, 2002).
"Investigation of a passive Q-switched, externally controlled, quasicontinuous or continuous pumped Nd:YAG laser," by Traian Dascalu et al, Opt. Eng. vol. 35, No. 5, 1247-1251 ( May 1996).
"Actively-controllable passively Q-switched laser," by Xiaodong Yin et al, Proc. SPIE vol. 5627, 199-208 (2005).

* cited by examiner

*Primary Examiner* — Jessica Stultz
*Assistant Examiner* — Joshua King
(74) *Attorney, Agent, or Firm* — Richard J. Kim

(57) ABSTRACT

A method and device for reducing the timing jitter in a passive Q-switched Nd:YAG solid state laser by spatially selective bleaching a thin sheet of a saturable absorber of $Cr^{+4}$:YAG from a direction orthogonal to the direction of laser emission where the $Cr^{+4}$:YAG transmission increases 18% when the bleaching probe beam is a single laser diode bar. For steady state operation of a passive Q-switched laser, the pulse-to-pulse timing jitter showed a −12× reduction in standard deviation from 241 nsec for free running operation to 20 nsec with optical triggering.

18 Claims, 5 Drawing Sheets

REDUCTION OF TIMING JITTER IN A PASSIVE Q-SWITCHED SOLID STATE LASER

GOVERNMENT INTEREST

The invention described herein may be manufactured, used, sold, imported, and/or licensed by or for the Government of the United States of America.

FIELD OF THE INVENTION

The present invention generally relates to lasers, and more particularly, Q-switched lasers.

BACKGROUND OF THE INVENTION

Laser designators are vital components in today's military high precision targeting engagements. A laser designator operator surgically selects a target by placing a high energy pulse-timing coded laser beam onto a target. The laser beam on the target serves as a guide to a high precision, semi-active laser guided munition.

Laser designation requires typical pulse energies of tens of milijoules (mJ), pulse widths of tens of nanoseconds (ns), and precise pulse timing of the pulses in the pulse train. This last requirement means that the pulse-to pulse timing jitter should be very low. In order to generate bursts of tens of ns pulses with required pulse energy and precise timing, laser Q-switching is used.

Q-switching of solid state lasers is a known method for achieving high pulse energy in solid state or other types of lasers. Q-switching is achieved by placing a temporally variable or optical power dependant loss element inside a laser cavity. When the loss element is in a low transmission state, the laser action is blocked so that high population inversion can be built up in the pumped gain medium, corresponding to a large stored energy. When the loss element switches to a high transmission state, laser action commences, quickly releasing the stored energy via stimulated emission. The Q-switched laser output is relatively short and high energy (and high peak power), with a typical pulse-width of tens of ns, and energy of tens of mJ in a Nd:YAG laser (with a typical 5 mm×5 mm crystal cross-section).

Generally, there are two methods of Q-switching lasers. The first method, known as active Q-switching, relies on an electrically controlled loss element, such as an electro-optic crystal that rotates a polarization state of a transmitted light. The polarization rotation of the electro-optic crystal can be translated into a change of optical transmission with a polarizer on the same optical axis as the electro-optic crystal.

The second Q-switching method is known as passive Q-switching. This method uses a saturable absorber, such as $Cr^{+4}$:YAG. The saturable absorber maintains a low optical transmission state when the laser gain medium is pumped until the round trip cavity gain becomes sufficient to overcome the cavity loss. This initiates laser action and a build-up of high optical fluence in the laser cavity, causing rapid bleaching of the saturable absorber, and generation of a high energy Q-switched pulse.

Comparing the active and passive Q-switching methods, each has distinct advantages and disadvantages. The active Q-switch laser is relatively large and costly but produces precisely timed pulses with low pulse-to-pulse jitter. The passive Q-switch laser is simple to implement, but has a large pulse-to-pulse timing jitter and lower overall laser efficiency. The timing jitter arises from a variety of factors, including thermal, spatial mode variations and pump noise. Previous efforts to reduce jitter include using a composite pump approach as described in J. B. Khurgin et al., Applied Optics 41, 1095-1097 (2002). Others have disclosed optical triggering but the implementation into a system is not very practical. See T. Dascalu et al., "Investigation of a passive Q-switched, externally controlled, quasicontinuous or continuous pumped Nd:YAG laser," Opt. Eng. 35, 1247-1251 (1996) and X. Yin et al., "Actively-controllable passively Q-switched laser," Proc. SPIE 5627, 199-208 (2005). Also, some have proposed direct bleaching of the saturable absorber. See U.S. Pat. No. 5,408,480 to H. Hemmati, U.S. Pat. No. 6,335,942 to Huang et al. and U.S. Pat. No. 7,324,568 to Spariosu et al. For both techniques, jitter reduction can be attributed to a rapid change induced in the laser cavity loss or gain, causing the Q-switching to occur at a precisely defined time. For the composite pump pulse, the Nd:YAG inversion was allowed to build to just below threshold, at which point a more intense pump pulse was added to rapidly increase the cavity gain. For the direct bleaching method, an optical pulse was used to bleach the saturable absorber, rapidly decreasing the cavity loss and driving the laser above threshold.

SUMMARY OF THE INVENTION

There is a significant need to decrease the power required to achieve direct bleaching of the saturable absorber as a means to reduce timing pulse jitter in a passively Q-switched laser. In order to directly bleach the entire volume of a typical 5×5 mm cross-section Cr:YAG saturable absorber, a relatively expensive laser diode stack, composed of numerous laser diode bars, and generating several kilowatts of peak power, needs to be used. This invention teaches that effective jitter reduction can be achieved by merely bleaching a thin sheet of saturable absorber rather than its entire volume, allowing an order-of-magnitude decrease in the peak power required from the laser diode. The reduced optical power requirement allows the use of a single and low cost laser diode bar rather than a laser diode stack. This and other advantages of the invention are achieved by spatially selective bleaching of a thin sheet in Cr:YAG by illuminating the crystal from a direction orthogonal from laser emission in the passively Q-switched laser resonator cavity.

To the accomplishment of the foregoing and related ends, the invention provides the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
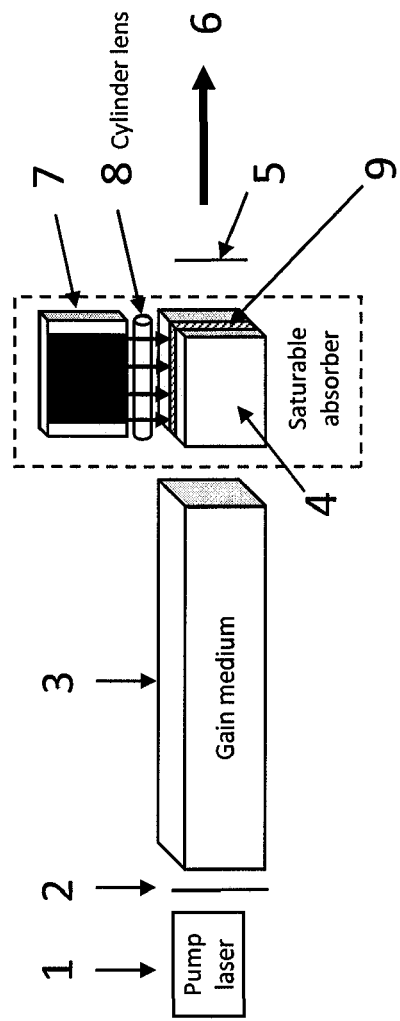
FIG. 1 is a diagram illustrating a Q-switched laser with spatially selective bleaching of a saturable absorber.
Figure 1A:
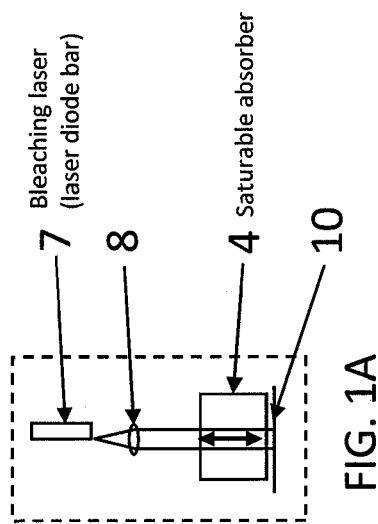
FIG. 1A is an end (on axis) view of the saturable absorber.

In the following detailed description, identical components have been given the same reference numerals. Referring now to the drawings, wherein like reference numerals designate like or corresponding parts, FIG. 1 shows a pump laser 1, dichroic mirror 2, gain medium 3, an optically triggered saturable absorber 4, output mirror 5 and Q-switched laser output 6. The saturated absorber 4 has components bleaching laser 7, cylinder lens 8 and bleached volume in the saturable absorber crystal 9. FIG. 1A is an end view of the saturable absorber 4 having a bleaching laser 7, cylindrical lens 8 and mirror 10.

Figure 2:
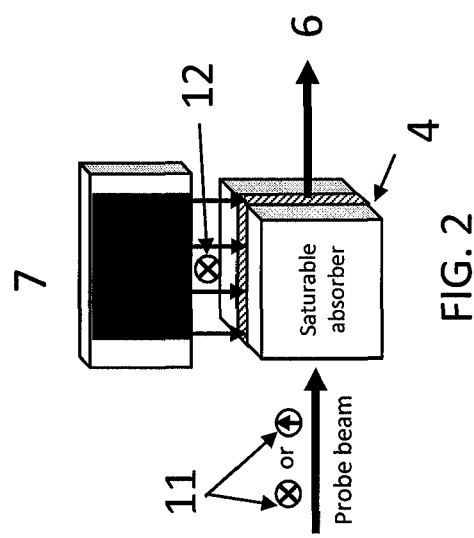
FIG. 2 shows the polarization selective bleaching of the saturable absorber.

FIG. 2 shows the probe beam polarization 11 of the saturable absorber 4 with a bleaching laser 7 and bleaching beam polarization 12.

Figure 3:
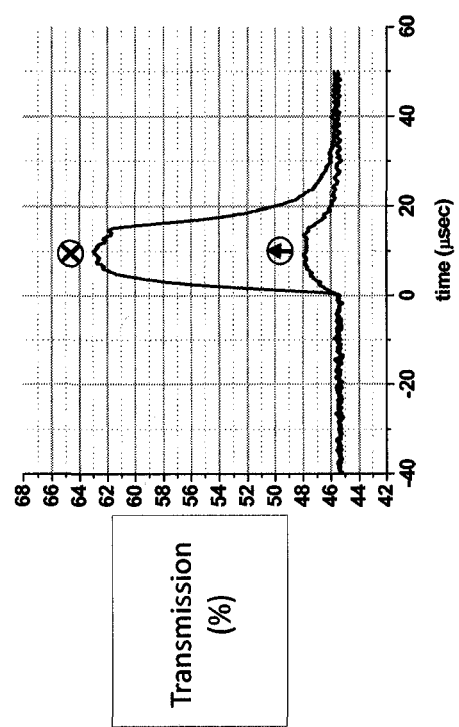
FIG. 3 is a graph showing the transmission measurement for two orthogonal polarization states of a bleaching beam.

FIG. 3 is a graph showing the transmission measurement for two orthogonal polarization states of a bleaching beam.

Figure 4:
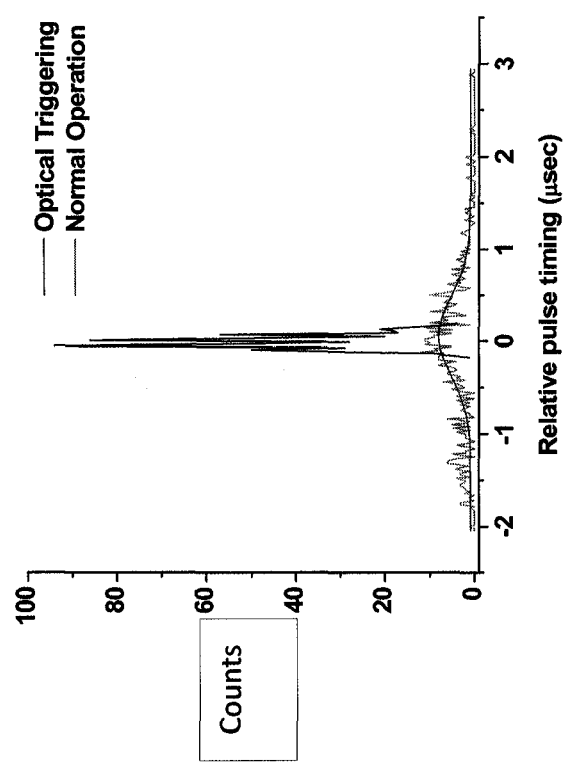
FIG. 4 is a graph showing the timing jitter reduction in a laser with a saturable absorber.

FIG. 4 is a graph showing the timing jitter reduction in a laser with a saturable absorber.

Figure 5:
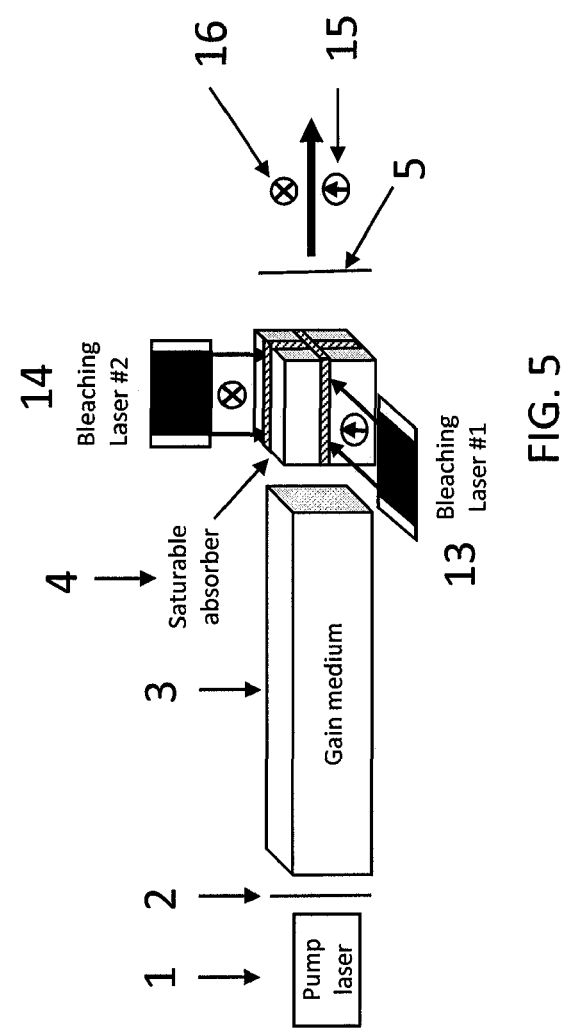
FIG. 5 is a diagram illustrating a Q-switched laser with polarization selection.

FIG. 5 shows another pump laser 1, dichroic mirror 2, gain medium 3, an optically triggered saturable absorber 4, mirror 5 and polarization of Q-switched laser output. The saturable absorber 4 contains bleaching laser #1 and bleaching laser #2.

Optical triggering of the solid state laser can be achieved by bleaching of a selected portion of the saturable absorber material, as shown in FIG. 1. The bleached region is defined by the shape of the bleaching laser beam, which preferably is shaped into a thin sheet, with its plane aligned parallel to the laser optical axis. The bleaching laser 7 is preferably at a wavelength that is strongly absorbed by the saturable absorber. For a commonly used Cr:YAG crystal saturable absorber 4, absorption is highest in the 900-1100 nm region, peaking at 1030 nm. A mirror 5 can be placed on the opposite side of the saturable absorber material to reflect back any bleaching light that is not completely absorbed in the first pass through the material. By bleaching a thin section or slice of the saturable absorber 4, as shown in FIG. 1, the optical transmission in that section is increased, and with sufficient gain medium gain level, laser action in the laser cavity is first initiated in the corresponding lateral section of the laser cavity. As the laser beam propagates back and forth inside the laser cavity, it spreads into the other regions of the laser, causing the entire volume of the saturable absorber to bleach. This allows stored energy to be extracted from the entire volume of the gain material, despite the fact that laser action first occurs in a small lateral section of the laser cavity.

The advantages of the described technique of spatially-selective bleaching of the saturable absorber is that it requires substantially lower bleaching laser power that would be needed to achieve the same change in the transmission in the entire saturable absorber volume. FIG. 3 shows the increase in transmission in the bleached section of a 3×3×3 mm $Cr^{4+}$:YAG saturable absorber when illuminated by a single 1030 nm laser diode bar that was collimated in the fast divergence direction by a cylindrical lens, as shown. The bleaching beam was shaped into a thin sheet of approximately 3 mm×0.1 mm, resulting in bleaching beam intensity of 70 kW/cm². This intensity caused a 18% increase in the saturable absorber transmission, as shown in the oscilloscope trace in FIG. 3, where the bleaching laser was turned on for approximately 10 μs.

The effect of an optical trigger with 70 kW/cm² bleaching light intensity on the pulse-to-pulse timing jitter of the Q-switched Nd:YAG laser is shown in FIG. 4. For the no-trigger case, the standard deviation of pulse-to-pulse interval distribution was 750 ns. With optical triggering, the standard deviation decreased by one order of magnitude, to 75 ns. The laser output energy of 15 mJ was approximately the same with self-Q-switching (no optical trigger) and optically triggered Q-switching. The laser operated at a pulse repetition frequency of 5 Hz. In a separate experiment, a 12× reduction in pulse to pulse timing jitter was measured where the standard deviation was reduced from ±241 nsec for the free running operation to a value of ±20 nsec with optical triggering.

In order to achieve a similar increase in transmission over the entire cross-section of the 3×3×3 mm Cr:YAG saturable absorber crystal, a bleaching laser with 300 times larger output power would be required. It would be difficult to achieve such high power from a laser diode, even with a laser diode stack consisting of multiple laser diode bars. The use of spatially selective bleaching makes it possible to use a single laser diode bar as the bleaching laser, making this approach much lower cost compared with using a laser diode stack.

Saturable absorber optical bleaching experiments carried out with Cr:YAG revealed that the magnitude of the transmission increase depended strongly on the polarization of the bleaching beam and polarization of the probe beam. FIG. 2 shows the polarizations of the probe beam and bleaching beam. FIG. 3 shows the change in transmission of a vertically and horizontally polarized probe beam when the Cr:YAG was illuminated by a bleaching light that was horizontally polarized. When the probe beam was polarized horizontally, matching the bleaching beam, its transmission increased by 18%, from 45% to 63% (upper curve). When the probe beam was polarized vertically, however, its transmission increased by only 3%, from 45% to 48% (lower curve). The magnitude of the optically induced bleaching was therefore strongly dependent on the relative polarization of the probe beam and the bleaching laser beam.

The measured change in transmission for the probe beam was the same as would be experienced by light propagating along the optical axis of the laser cavity. The reduction in the cavity propagation loss, therefore, depends on the relative polarization of the light propagating in the cavity and the polarization of the bleaching laser.

The polarization selective bleaching effect can be used to control the polarization of a Q-switched using a laser configuration shown in FIG. 5. The optically triggered Q-switched laser 1 utilizes a saturable absorber 4 that can be bleached by a vertically polarized laser #1 13 illuminating the vertical face of the saturable absorber, or a horizontally polarized bleaching laser #2 14 illuminating a horizontal face of the saturable absorber crystal.

When only the bleaching laser #1 is turned on 15, the transmission increase in the storable absorber is much larger for vertically polarized light than for horizontally polarized light in the laser cavity, so that the lasing threshold is substantially lower for vertically polarized light in the cavity. This causes the laser cavity to reach lasing condition for vertically polarized light at a gain medium pumping level substantially lower than that required for laser action for the horizontal polarization. The resulting laser Q-switched output therefore is vertically polarized.

Similarly, when only the bleaching laser #2 is turned on 16, laser action is first reached for the horizontally polarized light. The resulting Q-switched laser pulse therefore is horizontally polarized. By alternately turning on bleaching laser #1 or #2, the polarization of the Q-switched laser emission can be selected to be vertical or horizontal.

This polarization switching effect is useful when a nonlinear crystal is placed inside the laser cavity or outside the cavity. A nonlinear crystal can be oriented so that nonlinear frequency conversion, such as second harmonic generation, occurs for one orientation of laser polarization but not the orthogonal one. For the polarization that causes no nonlinear conversion in the nonlinear crystal, the laser emission simply passes through the crystal undisturbed. When polarization is switched to the orthogonal direction to maximize the nonlinear wavelength conversion efficiency, a large fraction of the laser emission is converted into second harmonic light. Switching the polarization state of the laser provides a means by which the output wavelength of the laser with nonlinear wavelength converter crystal can be changed.

The direct bleaching of a saturable absorber was found to be very effective in minimizing pulse-to-pulse timing jitter for a Q-switched Nd:YAG laser. Optical triggering was achieved using emission from a single laser diode bar incident on the Cr:YAG along a direction orthogonal to the laser axis, and shaped to bleach a thin slice of the crystal. For efficient triggering, it was found that the polarization of the bleaching pulse and polarization of the laser lay along a common crystallographic axis.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components (assemblies, devices, sensors, circuits, etc), the terms (including a reference to a "means") used to describe such components are intended to correspond, unless otherwise indicated, to any component which performs the specified function of the described component (i.e., functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method for reducing the timing jitter of pulses of laser emission from a passive Q-switched laser, comprising:
   disposing a laser diode bar to emit a polarized beam from a direction orthogonal to the direction of said laser emission for selectively bleaching a spatial portion of a saturable absorber material having a volume in the laser;
   disposing another laser diode bar to emit an orthogonally polarized beam from another direction orthogonal to the direction of said laser emission for selectively bleaching another spatial portion of said saturable absorber material having a volume in the laser; and
   switchably bleaching a select face of said saturable absorber, wherein at least one of said laser diode bars is switched to switchably bleach a thin sheet of said saturable absorber smaller in volume than said volume.

2. The method according to claim 1 wherein the passive Q-switched laser is Nd:YAG laser.

3. The method according to claim 1 wherein the saturable absorber is $Cr^{+4}$:YAG.

4. The method according to claim 1, wherein the bleaching by a polarized beam achieves maximum bleaching of the saturable absorber in the laser beam.

5. The method according to claim 1, wherein the beams are from a respective single laser diode bar shaped by a lens.

6. The method according to claim 1, wherein the laser is a solid state laser.

7. A passive Q-switched laser comprising:
   an optical resonator cavity capable of laser emission based on a saturable absorber having a volume disposed inside the cavity for blocking laser action in the cavity;
   one laser diode bar disposed as an external pump source providing a polarized bleaching beam from a direction orthogonal to the direction of said laser emission for optically illuminating the saturable absorber to cause it to selectively bleach a thin slice of the saturable absorber and initiate laser action in the cavity; and
   another laser diode bar disposed as an external pump source providing an orthogonally polarized bleaching beam from another direction orthogonal to the direction of said laser emission to cause it to selectively bleach another thin slice of the saturable absorber and initiate laser action in the cavity, wherein said laser diode bars are switchable to selectively bleach a portion of volume smaller than said volume.

8. The laser recited in claim 7, wherein the laser has an optical axis, the saturable absorber is positioned on the optical axis, and optical triggering is orthogonal to the axis.

9. The laser recited in claim 7, wherein the optical triggering is based on a respective external pump having its emission shaped by a lens.

10. The laser recited in claim 7, wherein at least one of the external pumps includes a laser diode bar stack.

11. The laser recited in claim 7, wherein the laser is a solid state laser.

12. The laser recited in claim 7, wherein the laser is a Nd:YAG laser.

13. The laser recited in claim 7, wherein the saturable absorber is $Cr^{+4}$:YAG.

14. The laser recited in claim 7 located in a laser designator device.

15. A passive Q-switched laser, comprising:
   a saturable absorber with a defined laser axis;
   a laser diode bar disposed to emit a polarized beam from a direction orthogonal to the laser axis for selectively bleaching a spatial portion of the saturable absorber, said polarized beam being linearly polarized so as to achieve laser emission with a specific linear polarization; and
   another laser diode bar disposed to emit an orthogonally polarized beam from another direction orthogonal to the laser axis for selectively bleaching another spatial portion of the saturable absorber, said orthogonally polarized beam effecting a laser emission of another polarization, wherein the timing jitter of laser emission is reduced by selectively bleaching a spatial portion of a saturable absorber having a volume in the laser, said polarized beams being switchable so as to achieve laser emission with a switchable linear polarization, wherein said selective bleaching switchably bleaches a thin sheet of said saturable absorber smaller in volume than said volume.

16. The laser recited in claim 15, wherein the laser is a Nd:YAG laser.

17. The laser recited in claim 15, wherein the saturable absorber is $Cr^{+4}$:YAG.

18. The laser recited in claim 15, wherein the laser is a solid state laser.

* * * * *